United States Patent Office 3,073,707
Patented Jan. 15, 1963

3,073,707
INK COMPOSITION
George F. Clark, 4619 W. 221st St., Fairview Park 26, Ohio, and Joseph J. Pauer, 20840 Endsley, Rocky River 16, Ohio
No Drawing. Filed Oct. 18, 1961, Ser. No. 145,999
5 Claims. (Cl. 106—22)

This invention relates to a hydrophilic printing ink composition, and more specifically to an ink for preparing planographic masters. Still more specifically, it relates to an ink composition to be used in preparing lithographic or offset masters. These planographic masters are particularly useful for preparing copies in a lithographic or offset duplicating machine, such as the Ditto or Multilith.

There are many instances, for example, where it is required that only part of the indicia on a master be duplicated on the subsequently prepared copies. An instance of this is where the master sheet contains guide lines, borders, headings, etc., which are not to be duplicated on the copy. By using the hydrophilic ink compositions of this invention, markings can be printed on the master, which will not be duplicated on the copies in an offset or lithographic duplicating machine. It is well known, for example, that planographic printing depends on the immiscibility of water and oil. Consequently, in preparing a master which is to be used in an offset or lithographic duplicating machine, the markings that are not to be duplicated are prepared from an ink that is non-reproducible or which is hydrophilic and susceptible to water, whereas the markings to be duplicated are prepared from a reproducible ink which is hydrophobic and repels water. These hydrophobic inks are known in the art as litho grease pencils and inks since they have a grease base which repeals water. By using these two different types of printing inks and preparing a master sheet, the non-reproducible ink will absorb water and thus will not be duplicated whereas the reproducible ink will repel water and consequently be duplicated on the copies.

The purpose of the hydrophilic ink composition of this invention is to provide master sheets having form matter and fill-in matter, wherein the fill-in matter is prepared from a hydrophobic or lithographic ink which is reproducible in an offset duplicator. Any type of office form can be run on an offset duplicator. The offset duplicator, however, is not limited to routine office forms and may be used in other fields for the preparation of letterheads, sales promotion sheets, interoffice bulletins, sales bulletins, mailing pieces, catalogs, and the like. The printed form matter may be obtained by any suitable or conventional printing press on the face of the master sheet. The non-duplicating form matter aids in placing the fill-in material in proper relationship to the form markings. This fill-in material is written, typed, or printed in a lithographic ink or by a marking pencil and is reproduced from the master sheet. The hydrophilic ink also may be used in a mimeograph machine in preparing the form matter on the master sheets. The ink composition, being extremely hygroscopic due to the presence of glycerol and sugar, will remain moist in the stenciling machine over long periods of time.

Once a master sheet has been prepared with both form matter and fill-in-matter by using conventional printing processes, copies of only the fill-in matter can be obtained from the master in an offset duplicating machine. It has long been recognized in the duplicating art that for certain purposes it is an advantage to be able to block out information carried on a master sheet so that the subsequently prepared copies will be free of the blocked-out data. This is accomplished in hectograph duplication by using what is known as block-out sheets which are superimposed over the master when it is desired to prevent part of the data on the master from being duplicated on the copies. To accomplish these same results according to this invention, however, the master is simply prepared from a hydrophilic nonreproducible ink which will not be duplicated on the copies obtained from the lithographic or offset duplicator.

Accordingly, it is an object of this invention to provide a hydrophilic printing ink composition.

It is another object of this invention to provide a hydrophilic ink composition which is non-reproducible in an offset or lithographic duplicating machine.

It is another object of this invention to provide an ink composition that can be used to print form matter on a planographic master sheet.

It is still another object of this invention to provide a method of preparing a duplicating master sheet which contains printed matter not reproducible in an offset or lithographic duplicating machine.

These and other objects of the invention will become apparent from a more detailed description of the invention as follows.

The hydrophilic ink composition of this invention comprises a water-glycerol base containing sugar, gelling agent, and a thickener. More specifically, the ink composition consists essentially of approximately 20 to 32 parts by weight of water, 3 to 8 parts by weight of glycerol, 50 to 60 parts by weight of sugar, 9 to 16 parts by weight of kaolin, and about 0.25 to 0.4 part by weight of an organic gelling agent. It is essential in preparing the ink composition that the water-to-glycerol ratio range from about 3 to 10 parts by weight of water to every part by weight of glycerol. The preferred water-to-glycerol ratio consists of approximately 5 to 7 parts by weight of water for every part by weight of glycerol. In order to obtain an ink having the proper consistency, it is essential that the sugar-to-water ratio range from approximately 1.5 to 2.2 parts by weight of sugar for every part by weight of water, and it is preferred that two parts by weight of sugar be present for every part by weight of water. The sugar renders the ink composition somewhat adhesive, giving the ink the proper amount of tack. To impart color to the ink any water-soluble organic dye may be used. However, it is preferable to use the water-soluble aniline dyes, such as aniline blue.

The relative proportions of the above ingredients are essential in that if, for example, too much water is used, it will not adhere to the printing press, whereas if insufficient water is added, the final ink composition will be stiff and not have the proper amount of adhesiveness. The glycerol is the greasy constituent which has lubricating characteristics giving the ink the proper spreading properties. It is the glycerol which absorbs and holds moisture which keeps the ink from drying at a rate such that it can cake on the press. If, on the other hand, the glycerol is in excess of that indicated, the final ink will be greasy and will not have the proper drying properties. In addition, the inks containing an excess of glycerol will not permit the water-soluble dye to transfer properly from the press onto the paper. With an insufficient amount of glycerol, the ink tends to dry and cake, thus having insufficient transfer properties to be a satisfactory ink. Sugar, being one of the critical ingredients, is essential in that it imparts to the ink the proper amount of tackiness required of a good ink. If there is excess tackiness in an ink, the material has a tendency to pick up and carry the paper rather than making a proper transfer from the plate to the printing material. If excess sugar is used, the mixture will tend to crystalize and eventually to solidify.

The filler or thickener of the water-glycerol base ink is the kaolin, which imparts to the liquid base a paste consistency. The proper amount of kaolin is used to regulate the thickness of the ink, which is essential in facilitating the application of the ink on the printing press. The water-soluble dye is added together with the gelatin so as to obtain a good dispersion of the dye in the ink composition. If an excess of gelatin is added, the composition will take on an elastic characteristic which will hinder the transfer properties. It is essential in preparing the ink composition of this invention that the ingredients impart to the ink hydrophilic properties such that it will attract, rather than repel, water. This characteristic is essential in using the ink for preparing planographic masters which are to be used on lithographic or offset duplicating machines.

Printing inks, like the processes of printing, are divided into three groups, consisting essentially of typographic, intaglio, and planographic. Intaglio printing is characterized by the use of a plate in which the lines and figures to be reproduced are depressed rather than raised, as in the case of typographic reproductions. Planographic printing includes those processes which print from a substantially flat surface, as contrasted with the elevated areas of typography. Both lithography and offset printing are considered planographic processes. Regardless of the plate which is used, these processes depend on the fact that a greasy or hydrophobic ink will not adhere to a moist surface, based on the theory that oil and water will not mix. Offset printing differs from lithography only in mechanical details. In lithography the ink is applied directly to the paper from the plate, whereas in offset printing the ink is transferred to a pad, which in turn contacts the sheet to be printed. In lithography, the plate cylinder is alternately moistened and then inked once during each revolution. The second roll is covered with a sheet which rotates in contact with the plate cylinder from which the design or printed matter is transferred. The impression cylinder passes against the second roll where the sheet of paper is passed receiving the ink which has been offset on the pad. Inks of this invention can be used in any of these printing processes to print form matter on a master sheet which will not be duplicated in a lithographic or offset duplicating machine. Thus, it is important that the present ink have the characteristics needed for a good printing ink. By using the components of this invention in the prescribed relative proportions, an ink can be obtained which will flow well and which can be drawn out to a thread, which is stated to be the quality of a "long" ink. It is desirable also that the proper amount of sugar be present to obtain an ink which is sufficiently sticky or tacky, and adheres to the paper to such a degree that it possesses the proper amount of tack. A good ink is one which is stated to have properties that will permit its use without loss of any printing characteristics. The terms "heavy," "soft," "short," or "long" are employed to describe the characteristics of inks, particularly offset printing ink compositions. A long ink is stringy or has a molasses-like consistency, whereas a short ink has the consistency of lard and stays in one spot without creeping. A short ink tends to pile on the rollers and to distribute poorly on the plate.

The hydrophilic ink may be used with a stencil to prepare master sheets from a stencil duplicator, which usually consists of a rotatable, perforated ink-containing drum. The drum has a blanket of absorbent material through which the ink penetrates and comes into contact with the stencil sheet, which is also wrapped around the drum but outside the blanket of absorbent material. The stencil comprises an impermeable sheet of paper or other material through which markings are cut so that the ink can penetrate and be transferred to the paper, which is run through the machine as the drum is rotated. The paper used to make the stencil usually is a thin impregnated wax-like paper which is normally impermeable but easily broken by the typewriter key or stylus. Thus, if there is, for example, some form matter or printed subject matter which is not to be reproduced on the copies, a master sheet can be prepared by using the ink composition of this invention with a stencil duplicator. With the master copy prepared from the stencil duplicator, other fill-in matter may be printed on the master sheet by using a greasy ink composition, such as the litho pencil, and be reproduced from the master sheet in an offset or lithographic duplicating machine.

In place of the gelatin, gum arabic, gum karaya, gum tragacanth, or the like can be used to make the ink more viscous. When the gelatin or gum is mixed with the aniline dye, glycerol, and water, it is advisable to strain the mixture to avoid any small particles of undissolved dye. In addition to the kaolin, other clays, such as china clay, attapulgite clay, and fuller's earth may be used to obtain fine dispersions of the coloring material.

The coloring material can be any water-soluble or hydrophilic dye, such as the aniline dyes, i.e. aniline blue, or the azo dyes, i.e. Congo red. An inorganic hydrophilic dye is ultramarine blue, which can be added to the ink composition in an amount ranging up to about one percent by weight of the total composition. The adhesive or binding properties of the sugar, together with the thickening properties of the gelatin and the anti-settling or dispersing properties of the clay, function to give the proper viscosity characteristics required of a good ink. Viscosity measurements are made at specific temperatures, and are regulated by adjusting the relative proportions of the ingredients to obtain proper distribution, penetration, tack, and other properties of an ink which is needed to suit the particular paper and process in which it is to be used. The viscosity of an ink and its penetration into the paper are related and, thus, on these properties the opacity or transparency of the ink will depend. A troublesome phenomenon occurring in inks is what is known generally as "livering" or flocculation of the vehicle, which causes the ink to coagulate and become in some cases very hard. This usually occurs, however, while the ink is in storage over long periods of time. By maintaining the relative proportions of the glycerol and water, the storage properties are improved and flocculation of the vehicle can be avoided.

Illustrations of the hydrophilic ink composition of this invention are given in the following examples.

*Example I*

| | Parts by weight |
|---|---|
| Water | 27.2 |
| Glycerol | 4.5 |
| Sugar | 54.4 |
| Kaolin | 13.5 |
| Gelatin | 0.3 |
| Aniline blue dye (water soluble). | |

*Example II*

| | |
|---|---|
| Water | 30.0 |
| Glycerol | 3.0 |
| Sugar | 55.0 |
| Kaolin | 11.7 |
| Gelatin (Knox) | 0.35 |

*Example III*

| | |
|---|---|
| Water | 27.0 |
| Glycerol | 3.4 |
| Sugar | 59.8 |
| Kaolin | 9.55 |
| Gelatin | 0.25 |

*Example IV*

| | |
|---|---|
| Water | 24.0 |
| Glycerol | 6.0 |
| Sugar | 55.7 |
| Kaolin | 15.0 |
| Gelatin | 0.3 |

Example V

| | Parts by weight |
|---|---|
| Water | 24.0 |
| Glycerol | 8.0 |
| Sugar | 52.0 |
| Kaolin | 15.6 |
| Gelatin | 0.4 |

Example VI

| | |
|---|---|
| Water | 32.0 |
| Glycerol | 7.0 |
| Sugar | 50.0 |
| Kaolin | 10.7 |
| Gelatin | 0.3 |

Example VII

| | |
|---|---|
| Water | 24 to 30 |
| Glycerol | 3 to 6 |
| Sugar | 52 to 56 |
| Kaolin | 11 to 14 |
| Gelatin | 0.25 to 0.40 |
| Coloring Material | <1 |

In preparing the ink compositions of this invention, there is no criticality with respect to the method by which each of the ingredients is mixed. It is preferred, however, that the glycerol-water vehicle be mixed with the dye and gelatin so as to obtain a good dispersion of the dye in the vehicle. To this mixture can be added the sugar, which imparts the adhesive characteristics, and the kaolin or clay which thickens and prevents the dye from settling from the mixture.

A preferred method of preparing the ink composition comprises heating a mixture of water and glycerol to which is added the gelatin and sugar while the mixture is maintained at a temperature of about 200° F. This mixture then is cooled to about room temperature, at which point the kaolin and coloring material is added with vigorous stirring.

The addition of the kaolin to the ink mixture imparts thixotropic properties thereto and gives the mixture a higher viscosity which prevents the settlement of the coloring material and at the same time gives the paste sufficient fluidity so that it may be used in conventional ink containers. The semi-liquid paste is simply added to the inkwell of a printing press which will permit continuous use without the necessity of refilling the inkwells at very short intervals.

The process of this invention involves making master sheets from which prints are prepared from a flat surface. The master is subdivided into ink-adherent printing areas and ink-repellant non-printing areas. The non-printing areas contain printed matter which may be prepared by using the hydrophilic ink of this invention and, therefore, will not be reproduced in lithographic or offset processes.

The foregoing description of the invention is illustrative and not restrictive, it being intended to limit the invention only by the scope of the appended claims.

The invention claimed is:

1. An ink composition consisting essentially of 24 to 32 parts by weight of water, 3 to 8 parts by weight of glycerol, 50 to 60 parts by weight of sugar, 9 to 16 parts by weight of clay, 0.25 to 0.4 part by weight of gelatin, and a small amount of a water-soluble organic dye.

2. A hydrophilic ink composition consisting essentially of 27.2 parts by weight of water, 4.5 parts by weight of glycerol, 54.4 parts by weight of sugar, 13.5 parts by weight of kaolin, 0.3 part by weight of gelatin, and a coloring proportion of an organic water-soluble dye.

3. The hydrophilic ink composition of claim 2, further characterized in that the organic dye is an aniline dye.

4. A method of preparing a master sheet which contains markings non-reproducible in a planographic duplicating machine, said markings being applied to the master sheet with an ink composition consisting essentially of 27.2 parts by weight of water, 4.5 parts by weight of glycerol, 54.4 parts by weight of sugar, 13.5 parts by weight of kaolin, 0.3 part by weight of gelatin, and a coloring amount of a water-soluble aniline dye.

5. The method of claim 4 wherein the markings contained on the master sheet are not reproducible in an offset duplicating machine.

References Cited in the file of this patent

UNITED STATES PATENTS 2,936,241    Sharp et al. _____ May 10, 1960

OTHER REFERENCES

Lesser: "Hectographic Inks," Amer. Ink Maker, September 1945 (pages 50, 51, 53, 55).